(12) United States Patent
Kizhepat (10) Patent No.: US 7,376,811 B2
(45) Date of Patent: May 20, 2008

(54) METHOD AND APPARATUS FOR PERFORMING COMPUTATIONS AND OPERATIONS ON DATA USING DATA STEERING

(75) Inventor: Govind Kizhepat, Sunnyvale, CA (US)

(73) Assignee: NetXen, Inc., Santa Clara, CA (US)

(*) Notice: Subject to any disclaimer, the term of this patent is extended or adjusted under 35 U.S.C. 154(b) by 448 days.

(21) Appl. No.: 09/992,637

(22) Filed: Nov. 6, 2001

(65) Prior Publication Data

US 2003/0088826 A1   May 8, 2003

(51) Int. Cl.
*G06F 15/00* (2006.01)
*G06F 15/76* (2006.01)

(52) U.S. Cl. .......... 712/15; 712/10; 712/246; 712/247; 715/501.1

(58) Field of Classification Search .......... 715/501.1; 709/238; 712/220, 10–22, 246–247; 710/316, 710/317
See application file for complete search history.

(56) References Cited

U.S. PATENT DOCUMENTS

| | | | | |
|---|---|---|---|---|
| 3,487,370 | A * | 12/1969 | Goshorn et al. | 710/33 |
| 4,445,172 | A * | 4/1984 | Peters et al. | 711/3 |
| 4,811,214 | A * | 3/1989 | Nosenchuck et al. | 712/11 |
| 4,891,787 | A * | 1/1990 | Gifford | 712/205 |
| 4,943,909 | A * | 7/1990 | Huang | 712/15 |
| 5,146,606 | A * | 9/1992 | Grondalski | 712/14 |
| 5,151,996 | A * | 9/1992 | Hillis | 712/15 |
| 5,212,773 | A * | 5/1993 | Hillis | 709/243 |
| 5,245,705 | A * | 9/1993 | Swaney | 709/245 |
| 5,247,613 | A * | 9/1993 | Bromley | 709/246 |
| 5,265,207 | A * | 11/1993 | Zak et al. | 712/15 |
| 5,274,782 | A * | 12/1993 | Chalasani et al. | 710/317 |
| 5,313,590 | A * | 5/1994 | Taylor | 710/317 |

(Continued)

FOREIGN PATENT DOCUMENTS

EP   0 410 435 A2 *   1/1991

(Continued)

OTHER PUBLICATIONS

Keyvani, Maryam, et al., "VHDL Implementaion of a Crossbar Packet Switch", Communications Networks Laboratory, School of Engineering Science, Simon Frasier University, Mar. 13, 2001, p. 1.*

(Continued)

*Primary Examiner*—John Breene
*Assistant Examiner*—Robert Stevens
(74) *Attorney, Agent, or Firm*—Haynes Beffel & Wolfeld LLP (57) ABSTRACT

A data processing system architecture is based upon a hardware engine that includes a plurality of functional units and data routing units that interconnect the functional units. The hardware engine performs operations and computations on data as the data traverses paths through the functional units under control of software. The functional units include logic resources, examples of which are flip-flops, latches, arithmetic logic units, random access memory, and the like. The routing units are responsive to the software control signals that are turned on or off to steer the data through these resources. Operations and computations are accomplished according to the steering of the data through the functional units that control the functions performed.

33 Claims, 5 Drawing Sheets

U.S. PATENT DOCUMENTS

| | | | | |
|---|---|---|---|---|
| 5,379,444 | A * | 1/1995 | Mumme | 712/11 |
| 5,388,214 | A * | 2/1995 | Leiserson et al. | 712/15 |
| 5,418,970 | A * | 5/1995 | Gifford | 712/20 |
| 5,481,743 | A * | 1/1996 | Baxter | 712/23 |
| 5,481,749 | A * | 1/1996 | Grondalski | 712/16 |
| 5,530,814 | A * | 6/1996 | Wong et al. | 710/317 |
| 5,559,970 | A * | 9/1996 | Sharma | 710/317 |
| 5,561,761 | A * | 10/1996 | Hicok et al. | 714/30 |
| 5,574,930 | A * | 11/1996 | Halverson et al. | 712/34 |
| 5,590,283 | A * | 12/1996 | Hillis et al. | 712/29 |
| 5,598,410 | A * | 1/1997 | Stone | 370/469 |
| 5,617,549 | A * | 4/1997 | DeLano | 712/206 |
| 5,671,435 | A | 9/1997 | Alpert | |
| 5,680,550 | A * | 10/1997 | Kuszmaul et al. | 712/11 |
| 5,689,508 | A * | 11/1997 | Lyles | 370/391 |
| 5,717,871 | A * | 2/1998 | Hsieh et al. | 710/317 |
| 5,726,586 | A * | 3/1998 | Chan et al. | 326/40 |
| 5,734,334 | A * | 3/1998 | Hsieh et al. | 340/2.2 |
| 5,751,955 | A * | 5/1998 | Sonnier et al. | 714/12 |
| 5,771,362 | A * | 6/1998 | Bartkowiak et al. | 710/317 |
| 5,790,821 | A * | 8/1998 | Pflum | 712/200 |
| 5,805,477 | A | 9/1998 | Perner | |
| 5,805,875 | A | 9/1998 | Asanovic | |
| 5,822,606 | A * | 10/1998 | Morton | 712/16 |
| 5,828,858 | A * | 10/1998 | Athanas et al. | 710/317 |
| 5,845,102 | A | 12/1998 | Miller et al. | |
| 5,867,724 | A * | 2/1999 | McMahon | 712/22 |
| 5,905,723 | A * | 5/1999 | Varghese et al. | 370/351 |
| 5,907,485 | A * | 5/1999 | Van Loo et al. | 700/3 |
| 5,930,492 | A * | 7/1999 | Lynch | 712/216 |
| 5,941,968 | A * | 8/1999 | Mergard et al. | 710/308 |
| 6,023,742 | A * | 2/2000 | Ebeling et al. | 710/107 |
| 6,044,080 | A * | 3/2000 | Antonov | 370/401 |
| 6,055,599 | A * | 4/2000 | Han et al. | 710/317 |
| 6,065,070 | A * | 5/2000 | Johnson | 710/22 |
| 6,078,990 | A * | 6/2000 | Frazier | 711/114 |
| 6,081,884 | A | 6/2000 | Miller | |
| 6,088,783 | A * | 7/2000 | Morton | 712/22 |
| 6,112,294 | A * | 8/2000 | Merchant et al. | 712/219 |
| 6,142,683 | A * | 11/2000 | Madduri | 717/128 |
| 6,157,955 | A * | 12/2000 | Narad et al. | 709/228 |
| 6,182,206 | B1 * | 1/2001 | Baxter | 712/43 |
| 6,185,633 | B1 * | 2/2001 | Johnson | 710/22 |
| 6,223,242 | B1 * | 4/2001 | Sheafor et al. | 710/317 |
| 6,226,735 | B1 * | 5/2001 | Mirsky | 712/18 |
| 6,230,175 | B1 | 5/2001 | Okamoto et al. | |
| 6,253,313 | B1 * | 6/2001 | Morrison et al. | 712/226 |
| 6,256,740 | B1 * | 7/2001 | Muller et al. | 726/12 |
| 6,263,415 | B1 * | 7/2001 | Venkitakrishnan | 712/11 |
| 6,272,619 | B1 * | 8/2001 | Nguyen et al. | 712/41 |
| 6,279,100 | B1 * | 8/2001 | Tremblay et al. | 712/24 |
| 6,304,568 | B1 * | 10/2001 | Kim | 370/387 |
| 6,314,487 | B1 * | 11/2001 | Hahn et al. | 710/317 |
| 6,330,242 | B1 * | 12/2001 | Ogawa et al. | 370/395.52 |
| 6,378,021 | B1 * | 4/2002 | Okazawa et al. | 710/317 |
| 6,378,061 | B1 * | 4/2002 | Carbine et al. | 712/200 |
| 6,412,061 | B1 * | 6/2002 | Dye | 712/32 |
| 6,438,585 | B2 * | 8/2002 | Mousseau et al. | 709/206 |
| 6,438,680 | B1 * | 8/2002 | Yamada et al. | 712/210 |
| 6,473,827 | B2 * | 10/2002 | McMillen et al. | 710/316 |
| 6,519,695 | B1 * | 2/2003 | Kostic et al. | 712/221 |
| 6,594,698 | B1 * | 7/2003 | Chow et al. | 709/226 |
| 6,597,692 | B1 * | 7/2003 | Venkitakrishnan | 370/380 |
| 6,636,933 | B1 * | 10/2003 | MacLellan et al. | 710/317 |
| 6,651,131 | B1 * | 11/2003 | Chong et al. | 710/317 |
| 6,661,788 | B2 * | 12/2003 | Angle et al. | 370/390 |
| 6,675,283 | B1 * | 1/2004 | Cichon | 712/32 |
| 6,690,659 | B1 * | 2/2004 | Ahmed et al. | 370/328 |
| 6,728,777 | B1 * | 4/2004 | Lee et al. | 709/238 |
| 6,799,252 | B1 * | 9/2004 | Bauman | 711/149 |
| 6,836,815 | B1 * | 12/2004 | Purcell et al. | 710/317 |
| 6,842,104 | B1 * | 1/2005 | Osaka et al. | 340/2.28 |
| 6,874,079 | B2 * | 3/2005 | Hogenauer | 712/201 |
| 7,028,134 | B2 * | 4/2006 | Wang et al. | 710/317 |
| 7,043,596 | B2 * | 5/2006 | McWilliams et al. | 710/317 |
| 7,127,590 | B1 * | 10/2006 | Lindquist | 712/29 |
| 2001/0042193 | A1 * | 11/2001 | Fleck et al. | 712/220 |
| 2002/0009095 | A1 * | 1/2002 | Van Doren et al. | 370/432 |
| 2002/0038339 | A1 * | 3/2002 | Xu | 709/203 |
| 2002/0116715 | A1 * | 8/2002 | Apostolopoulos | 725/86 |
| 2002/0122428 | A1 * | 9/2002 | Fan et al. | 370/395.4 |
| 2003/0191879 | A1 * | 10/2003 | Marmash | 710/113 |
| 2005/0076194 | A1 * | 4/2005 | Kanapathippillai et al. | 712/241 |

FOREIGN PATENT DOCUMENTS

| | | |
|---|---|---|
| EP | 0 456 201 A2 * | 11/1991 |
| JP | 06-274459 | 9/1994 |
| JP | 09-294069 | 11/1997 |
| JP | 10-111790 | 4/1998 |
| JP | 11-219279 | 8/1999 |

OTHER PUBLICATIONS

Chang, Andrew, et al., "The Effects of Explicitly Parallel Mechanisms on the Multi-ALU Processor Cluster Pipeline", Computer Systems Laboratory, Stanford University, © 1998, pp. 1-8.*

Goldstein, Seth Copen, et al., "PipeRench: A Coprocessor for Streaming Multimedia Acceleration", School of Computer Science, Carnegie Mellon University, May 1999, pp. 1-12.*

Hamblen, James O., "Rapid Prototyping Using Field Programmable Logic Devices", IEEE Micro, May-Jun. 2000, pp. 29-37.*

Derfler, Frank J., et al., How Networks Work, Millenium Edition, Que Corp., Indianapolis, IN, Sep. 2000, pp. 86-87, 134-135, 139-141, 147-149, 162-165, 186-189 196-197.*

Comer, Douglas E., Internetworking with TCP/IP, vol. I, 2nd Edition, Prentice Hall, Englewood Cliffs, NJ, © 1991, pp. 100-104, 154-156, 183-186 and 506.*

Stevens, W. Richard, UNIX Network Programming, Prentice Hall, Englewood Cliffs, NJ, © 1990, pp. 258-262, 264-269, 284-289 and 314-315.*

"Networking Basics", downloaded from: dbserv.jinr.ru/js/content/java/New-tutorial/networking/overview/networking.pdf, Oct. 7, 1998, pp. 1-4.*

Vaidya, Aniruddha S., et al., "LAPSES: A Recipe for High Performance Adaptive Router Design", downloaded from: www.cse.psu.edu/~anand/csl/papers/hpca99.pdf, 1999, 8 pages.*

"XB1 Crossbar Switch Data Sheet", Sun Microelectronics, Jul. 1997, pp. 1-14.*

Arnold, Jeffrey, "The Splash 2 Software Environment", IDA Supercomputing Research Center, © 1993, [IEEE 0-816-3890-7/93], pp. 88-93.*

Sakr, Majd F., et al., "Reconfigurable Processor Employing Optical Channels", Proc. SPIE—Int. Soc. Opt. Eng., vol. 3490, Brugge, Belgium, Jun. 17-20, 1998, pp. 564-567.*

Nosenchuck, D.M. et al., Two-Dimensional Nonsteady Viscous Flow Simulation on the Navier-Stokes Computer MiniNode, Journal of Scientific Computing, vol. 1, No. 1, 1986, pp. 53-73.

* cited by examiner

METHOD AND APPARATUS FOR PERFORMING COMPUTATIONS AND OPERATIONS ON DATA USING DATA STEERING

BACKGROUND OF THE INVENTION

1. Field of the Invention

The present invention relates to system architectures for data processing, and more particularly to an architecture based upon a hardware engine which performs operations and computations on data as the data traverses paths controlled by software.

2. Description of Related Art

Traditional data processing systems are based on architectures having a pipeline based execution unit, and instruction fetch unit, and a storage unit which are operated in response to decoded instructions. The instructions are decoded to produce microcode that controls the operation of the data processing pipeline. The execution unit is a very complicated general-purpose logic system designed to execute a fixed number of operations under microcode control, and which becomes inflexible and difficult to change as its complexity grows.

This traditional architecture arose because the cost of the manufacture and design of logic has been historically higher than the cost of moving data into the logic system. However, recent advances in manufacturing and design are bringing down the cost of the design and implementation of logic, as compared to the cost of routing signals.

It is an object of the present invention to take advantage of this trend in integrated circuit and data processing system manufacturing and design to provide a data processing architecture that reduces the complexity and inflexibility of data processing systems.

SUMMARY OF THE INVENTION

The present invention provides an architecture based upon a hardware engine that includes a plurality of functional units and data routing units that interconnect the functional units. The hardware engine performs operations and computations on data as the data traverses paths through the functional units under control of software. The functional units include logic resources, examples of which are flip-flops, latches, arithmetic logic units, random access memory, and the like. The routing units are responsive to the software control signals that are turned on or off to steer the data through these resources. Operations and computations are accomplished according to the steering of the data through the functional units, rather than according to decoding of operation commands that control the functions performed on the data by a general purpose execution unit, as typical in the prior art.

Thus, one embodiment of the present invention comprises a data processing system. The data processing system includes a plurality of functional units and a plurality of routing units. The routing units are responsive to respective routing control signals and are coupled to the plurality of functional units. The routing units steer data among the plurality of functional units in response to routing control signals that indicate a source functional unit and a destination functional unit for a data unit being routed. Control word logic supplies the routing control signals to the plurality of routing control units. In one embodiment, the routing units operate synchronously, so that the data words subject of the operations are available to the functional units from the routing control units within timing constraints set up according to the plurality of functional units in the system.

The routing units comprise in various embodiments crossbar switches and multiplexers.

The functional units include in various embodiments storage elements, arithmetic logic units, table lookup units, complex logic units, data word shifter units, memory responsive to addresses, First-In-First-Out FIFO buffers, or any other logical unit designed to perform a function on data supplied on inputs, and to provide data at an output or outputs. In preferred embodiments, the functional units comprise logic dedicated to specific tasks, where the logic may be hardwired or based completely or in part on software.

In other embodiments of the present invention, the architecture is applied in a hierarchical fashion. Thus, one embodiment of the invention comprises a plurality of functional blocks, one or more of the plurality of functional blocks including a plurality of functional units, routing units and control word logic as discussed above. Block level routing units are also applied, along with block level control word logic.

The present invention also provides a new method of processing data in a data processing engine that includes a plurality of functional units. The method includes providing a set of control words that specify a route among the plurality functional units, and routing data among the plurality of functional units according to the set of software control words to produce a result. Also, in some embodiments, the method includes compiling the set of software control words from a high-level programming language specifying the result.

The present invention also provides a new method of processing data in a data processing engine that includes a plurality of functional units. The process includes providing a first set of software control words that specify a first data path according to a first configuration of the plurality of functional units; and providing a second set of software control words that specifies a second data path according to a second configuration of the plurality of functional units, whereby the plurality of functional units is reconfigured to perform a different function.

Other aspects and advantages of the present invention can be seen upon review of the figures, detailed description and the claims, which follow.

DETAILED DESCRIPTION

Figure 1:
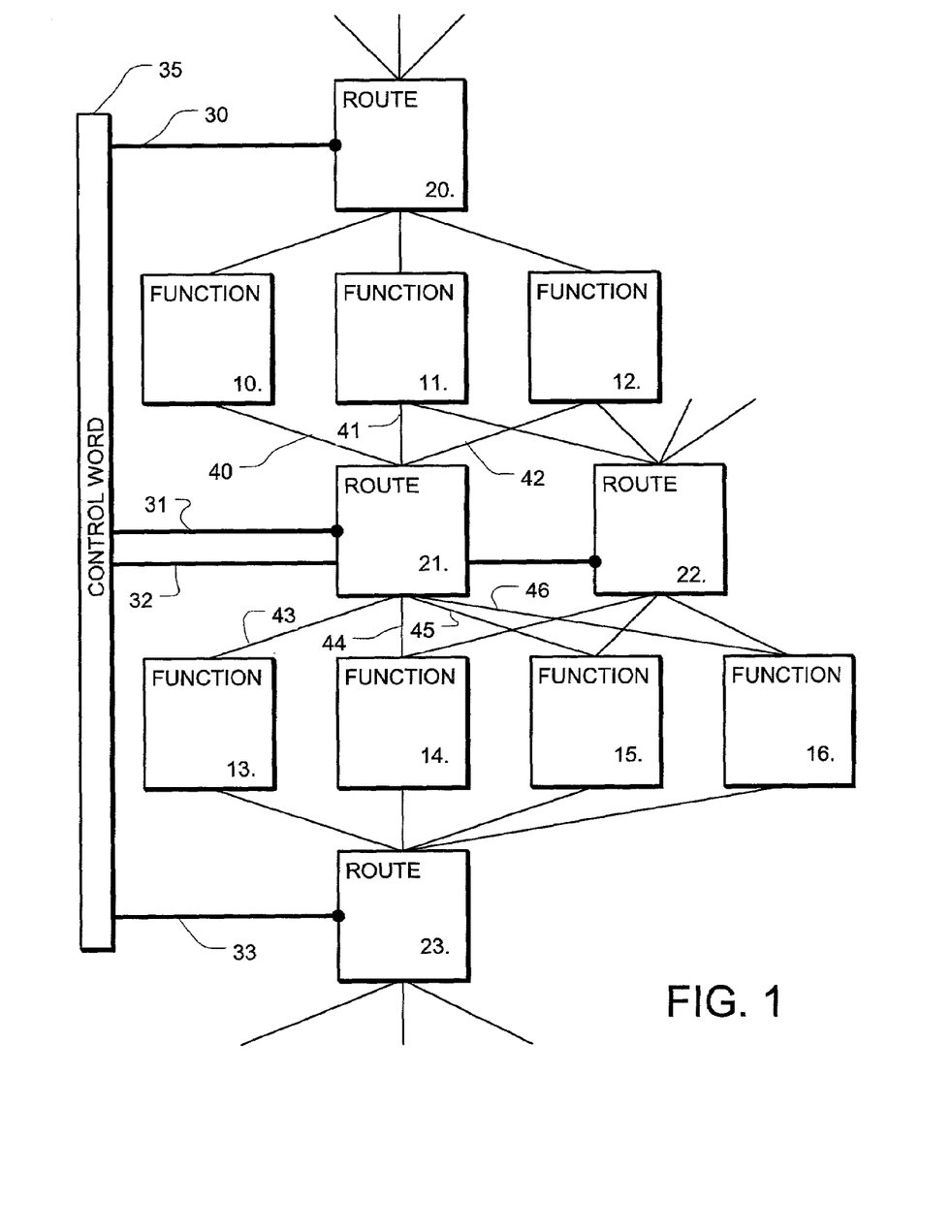
FIG. 1 a simplified architectural diagram for a data processing system according to the present invention.

A detailed description of embodiments of the present invention is provided with respect to FIGS. 1 through 5. In FIG. 1, the data processing system according to the present invention includes a plurality of functional units 10-16, and a plurality of routing units 20-23. The routing units are controlled by respective control signals 30-33 from control word logic 35. The control signals combined define a software control word by which a data path is defined through the plurality of functional units 10-16.

Each of the control signals, e.g. control signal 31 applied to routing unit 21, indicate both a source and a destination for a data unit traversing the routing unit. Thus, routing unit 21 includes inputs 40-42 and outputs 43-46. The control signal indicates an input and an output, such as input 41 and output 45, uniquely specifying a path through the routing unit. According to the control signal 31 having a value 41:45, the routing unit accepts data on line 41 from functional unit 11 and routes the data to functional unit 12. Also, for some types of functional units, such as memory, the control signals include indicators of a source and destination, as well as other control signals like a write strobe or a read strobe to be used by the destination or the source functional unit.

The functional units 10-16 are made up of typical logic units, including storage elements, memory arrays, arithmetic logic units, shifters, inverters, concatenating logic, counters, adders, floating point arithmetic units, timers and others. Also, functional units 10-16 comprise special-purpose logic in some embodiments.

The routing units 20-23 are made up of typical routing circuitry, including multiplexers, buses, crossbar switches, local area network switches, and the like. Also, routing units 20-23 comprise special purpose routing units in some embodiments.

The control words are provided by software without decoding in preferred systems. These control words are generated by compilers, which transform high-level programming languages like Java, C, and C++, into the control word language of the architecture. The compilers provided for this function are given a specification of the functional units, the routing units and the interconnection of the functional units and routing units. Also, the compilers are provided with the format of the control signals used for specifying a source and a destination for each of the routing units.

Figure 2:
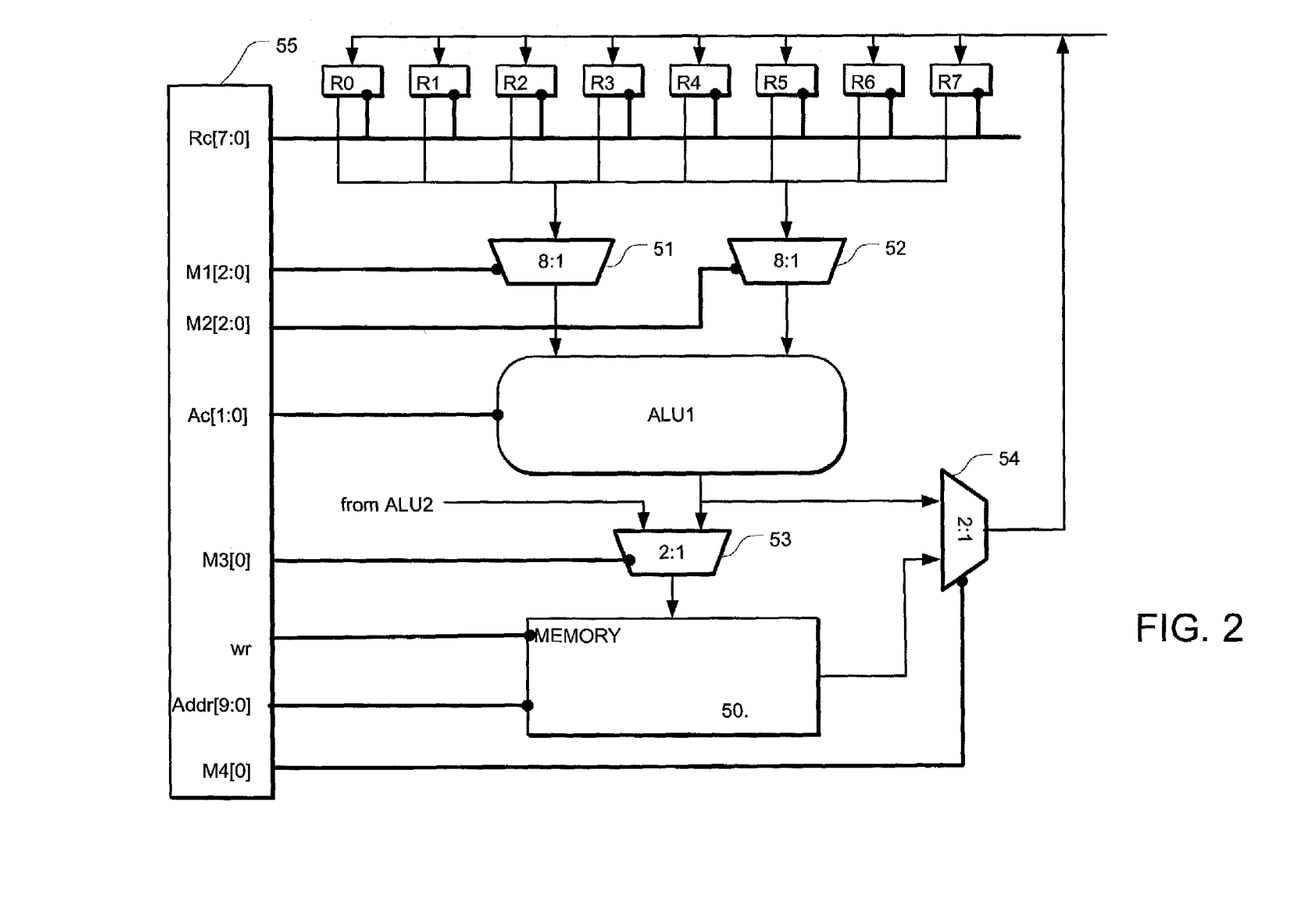
FIG. 2 is a logic diagram of a data processing system implemented according to the present invention.

FIG. 2 illustrates a simple data processing system having the architecture of the present invention. In this data processing system, the functional units include a plurality of registers R0 through R7, arithmetic logic unit ALU1 which performs multiple functions and provides output for each, arithmetic logic unit ALU2 (not shown) and a memory 50. The routing units include a set of multiplexers 51-54, and associated routing logic of the functional units such as read strobes, write strobes, and addresses.

The control word 55 includes control signals Rc which operate as strobes for the registers, M1 which controls multiplexer 51, M2 which controls multiplexer 52, Ac which selects one of four results available as output from the arithmetic logic unit ALU1, M3 which controls multiplexer 53, wr which operates as a write strobe for the memory 50, Addr which provides an address to the memory 50, and M4 which controls multiplexer 54. Control word logic applies the control word 55 to the plurality of routing units synchronously so that timing constraints of the plurality of dedicated functional units are observed.

In order to understand the present invention, consider how an addition would get done according to a prior art reduced instruction set RISC architecture. In a RISC architecture, an add instruction appears as follows:

ADD R1, R4, R5 or as ADD R1, R4, Addr[9:0]

for the cases in which the result is stored back to a register and the result is stored into memory, respectively. This ADD instruction would get decoded and the necessary signals generated internally to send the data through various pipeline stages of an execution unit to execute the add operation. According to the present invention however, the control words would be generated so that data from registers R1 and R4 would be steered by the multiplexers 51 and 52 to the inputs of ALU1. The control signal Ac[1:0] operates to select as the output of ALU1, a result (e.g. the result generated by an addition of its inputs) of the four results generated by the four available functions of the ALU1. The output of ALU1 gets steered into the register R5 by the multiplexer 54. To write the value to the register R5, the control signal Rc corresponding to the register R5 would be activated so that the register will store the value. For the case in which the value is to be written to the memory 50, the control signal wr would be activated along with the address Addr[9:0] to write the data into the correct location in the memory 50.

Thus, the data is steered through the resources using a sequence of control words provided by the control word logic 55 acting as distribution cicuitry. The control words each provide the control signals that specify the source and destination for data being routed by the routing units 51-54, the associated routing functions in the registers, and a memory 50. In the preferred systems, there are no operation commands that affect the function performed on the data by the functional units. Rather, the function performed on the data is hardwired in, or otherwise provided in, the dedicated functional units.

The example in FIG. 2 illustrates some diversity in the manner in which the functional units and routing units could be interconnected and implemented. For example, the routing unit 54 routes data from the ALU1 back to the inputs of the registers to set up a recursive path. The routing unit 53 accepts inputs from other functional units not shown, such as a second arithmetic logic unit ALU2. Also, the routing unit 54 is able to route data from the memory 50 back to the registers.

Another feature shown in the example of FIG. 2 is the use of immediate data for the addresses and control signals, like a write strobe. That is, the addresses and write strobe are part of the control word 55. In alternative systems, one of the functional units may be employed to generate addresses, or other types of control signals used by the routing units. Also, offset addressing might be utilized by providing an offset as a part of the control word with a base address provided by functional unit, or vice versa.

Figure 3:
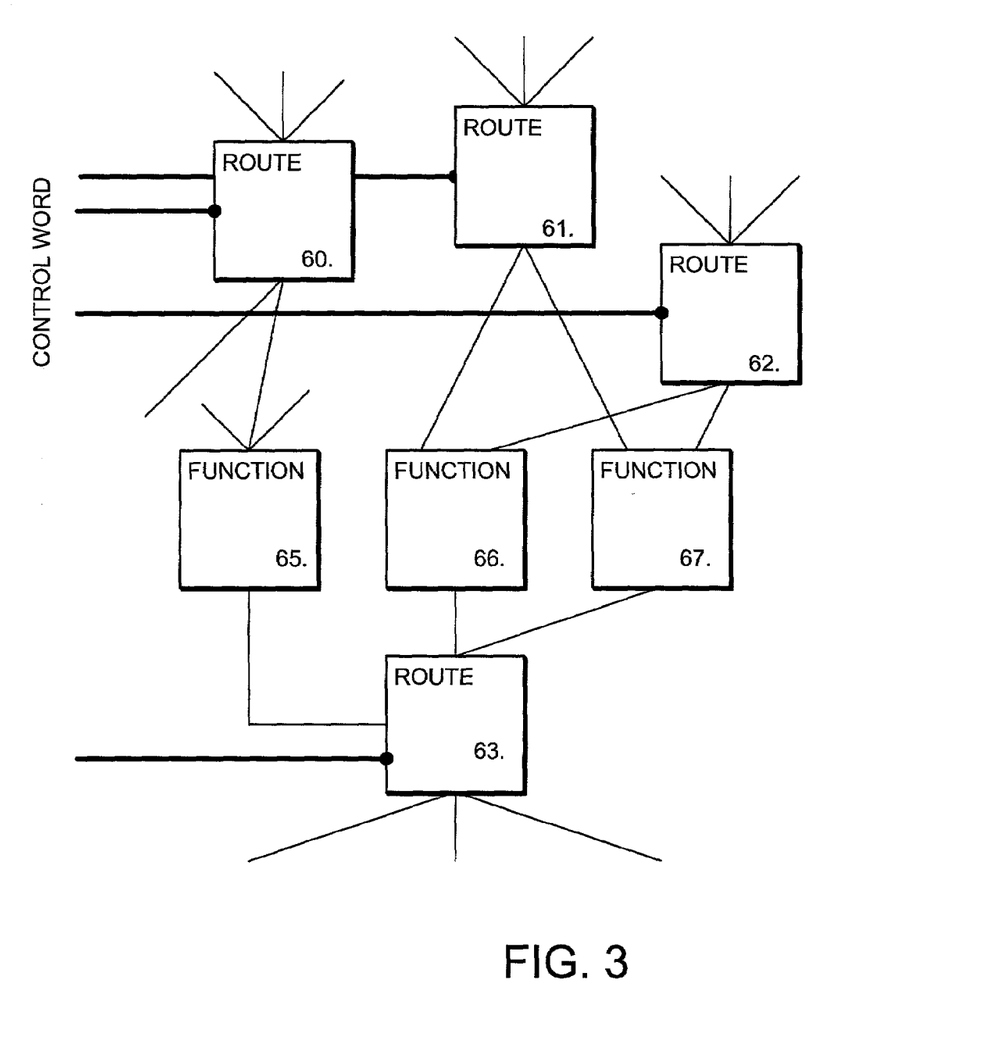
FIG. 3 is a simplified architectural diagram of a data processing system showing variations on the architecture of the present invention.
Figure 4:
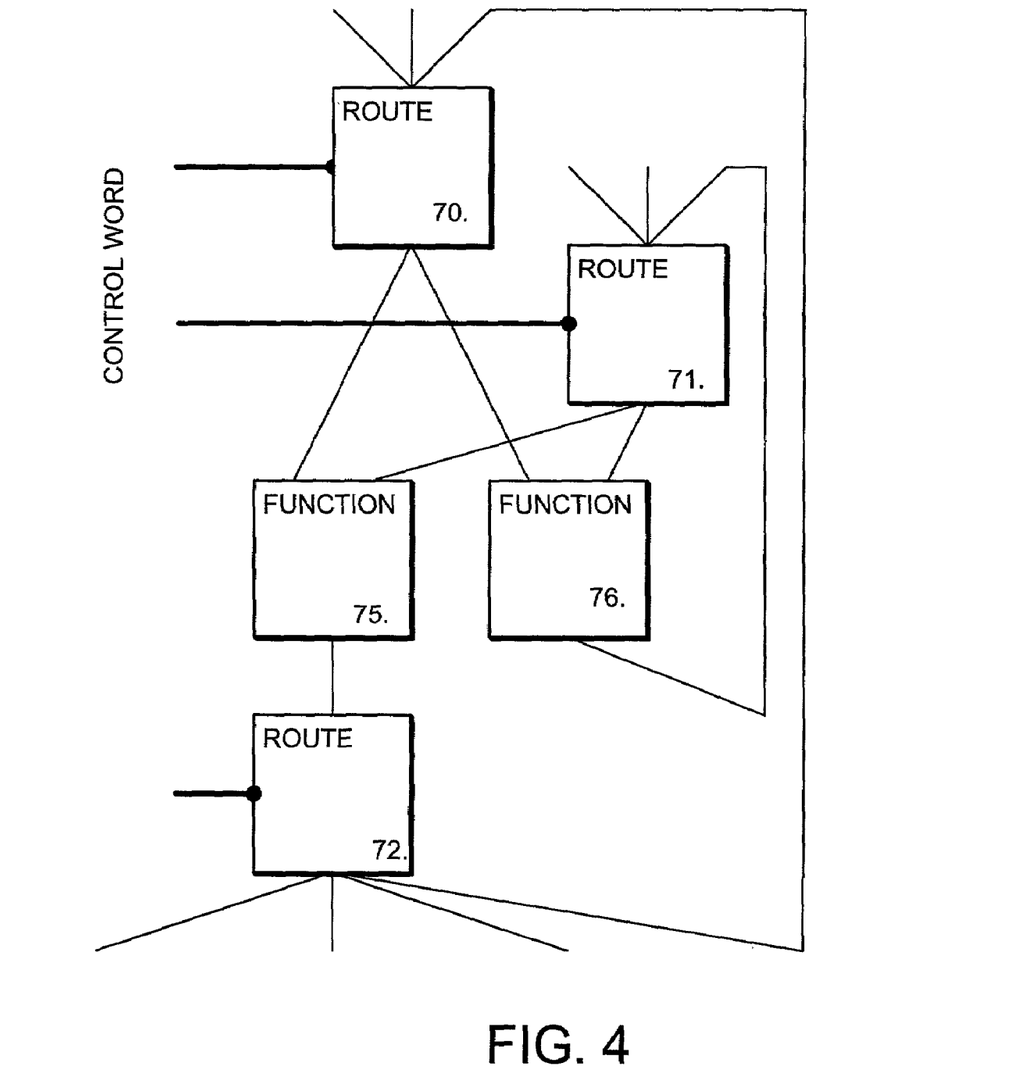
FIG. 4 is a simplified architectural diagram of a data processing system showing other variations on the architecture of the present invention.

FIGS. 3 and 4 show other architectural variations that are possible. Thus, in FIG. 3 the use of a functional unit for the purposes of providing a routing signal is illustrated. In FIG. 3, the plurality of routing units include routing units 60-63 and the plurality of functional units include functional units 65-67. Functional units 66 and 67 have multiple inputs, while functional unit 65 has a single input. The output of functional unit 65 is applied as a control signal to the routing unit 63. Also, FIG. 3 illustrates that more than one routing unit, such as routing units 61 and 62 may apply inputs to a single functional unit, such as functional unit 63.

In FIG. 4, the data processing system includes routing units 70-72 and functional units 75-76. Both functional units 75 and 76 include multiple inputs and single outputs. The output of functional unit 76 is applied as an input to a routing unit 71 which has its output coupled to the input of functional unit 76. Thus, functional unit 76 is able to operate in a direct feedback, iterative loop. Also, in FIG. 4, output of the routing unit 72 is applied as an input to the routing unit 70, illustrating feedback across multiple levels of routing.

As the complexity of data processing systems implemented according to the present architecture increases, hierarchical designs are available. Thus, any of the functional units in an architecture, such as that shown in FIG. 1, may comprise its own data processing system having a plurality of functional units and routing units operating according to its own control word logic.

Figure 5:
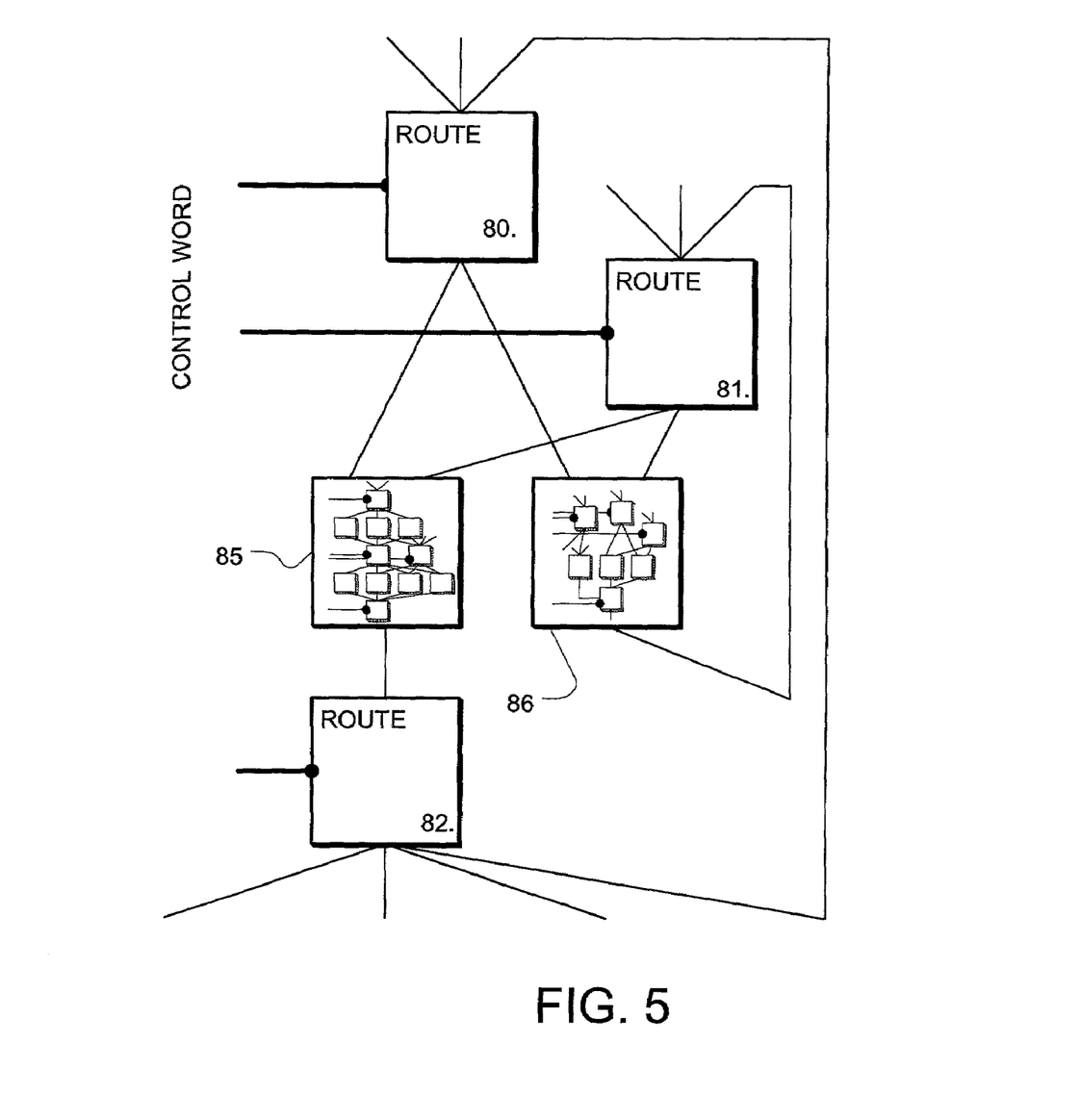
FIG. 5 is an architectural diagram of a data processing system according to the present invention implementing a hierarchical approach.

One hierarchical design is shown in FIG. 5. In FIG. 5, block level routing units 80-82 interconnect functional blocks 85 and 86. The functional blocks 85 and 86 each comprise a hardware engine including a plurality of functional units and unit level routing units, which are controlled by control words as described above with respect to FIGS. 1-4. Thus, each of the functional blocks 85 and 86 includes control word logic, which applies control words according to a compiled program at the functional unit level. The entire system in FIG. 5 is likewise controlled by control words provided by a compiled program at the functional block level. The hierarchical design can be applied in many levels, to facilitate higher level programming approaches.

CONCLUSION

Accordingly, the present invention provides an architecture based upon a new paradigm for design and implementation of data processing systems. Control words are generated by compiling high level programming language, and consist of control signals for routing units. The control signals synchronously steer data among a plurality of functional units which are optimized for particular functions. No decoding of operation commands is required, vastly simplifying implementation and design of the hardware engine.

In embodiments of the present invention, the data gets steered among the functional units and functional blocks, and in the process of traversing through the different paths, the desired operations are performed.

The foregoing description of embodiments of the invention has been provided for the purposes of illustration and description. It is not intended to be exhaustive or to limit the invention to the precise form disclosed. Many modifications and variations will be apparent. The embodiments were chosen and described in order to best explain the principles of the invention and its practical application, thereby enabling others to understand the invention for various embodiments and with various modifications as are suited to the particular use contemplated. It is intended that the scope of the invention be defined by the following claims.

I claim:

1. A data processing system, comprising:
a plurality of functional units having respective inputs and outputs, and adapted to perform respective tasks using input data at the respective inputs and to supply output data at the respective outputs, within a cycle;
a plurality of routing units, responsive to respective routing control signals, by which data is steered among inputs and outputs of the plurality of functional units, routing units in the plurality of routing units being coupled to respective subsets of functional units in the plurality of functional units, wherein at least one of said respective subsets is different than another of said respective subsets; and
control word distribution circuitry which supplies the routing control signals in parallel to the plurality of routing units to establish a route for a cycle, where the route includes applying data output in the cycle by a first functional unit in the plurality of functional units as input in the cycle to a second functional unit in the plurality of functional units, and applying data output by the second functional unit in the cycle as input in the cycle to a third functional unit in the cycle.

2. The data processing system of claim 1, wherein said plurality of routing units includes at least one multiplexer having a plurality of inputs and coupled to respective functional units in the plurality of functional units and at least one output coupled to a functional unit in the plurality of functional units, and the routing control signal for the multiplexer specifies one of a plurality of inputs to indicate a source functional unit, and one of the at least one outputs to indicate a destination functional unit.

3. The data processing system of claim 1, wherein said plurality of routing units includes at least one crossbar switch.

4. The data processing system of claim 1, wherein said plurality of functional units includes at least one storage element.

5. The data processing system of claim 1, wherein said plurality of functional units includes at least one logic block which performs a plurality of available functions, and includes logic to select an output from one of the plurality of available functions in response to a routing control signal.

6. The data processing system of claim 1, wherein said plurality of functional units includes a memory responsive to addresses, write control signals, and read control signals, and the control word distribution circuitry supplies at least one of the write control signals and read control signals.

7. The data processing system of claim 6, wherein the control word distribution circuitry supplies an address for said memory.

8. The data processing system of claim 6, wherein an address for said memory is supplied by one of the plurality of functional units.

9. The data processing system of claim 1, wherein functional units in the plurality of functional units comprise logic dedicated to specific processing tasks.

10. The data processing system of claim 1, wherein functional units in the plurality of functional units comprise hardwired logic dedicated to specific processing tasks.

11. The data processing system of claim 1, wherein said control word distribution circuitry supplies said routing control signals synchronously to the plurality of routing units.

12. A data processing system, comprising:
a plurality of processing blocks having respective inputs and outputs, and adapted to perform respective processes using input data at the respective inputs and to supply output data at the respective outputs, within a cycle;
a plurality of routing units, responsive to respective routing control signals for the plurality of processing blocks, by which data is steered among the inputs and outputs of the plurality of processing blocks, routing units in the plurality of routing units being coupled to respective subsets of processing blocks in the plurality of processing blocks, wherein at least one of said respective subsets of processing blocks is different than another of said respective subsets processing blocks; and
block level control word distribution circuitry which supplies control words for respective cycles to the plurality of routing units, said control words including the routing control signals for the plurality of routing units; wherein processing blocks in said plurality of processing blocks respectively include a plurality of functional units having respective inputs and outputs, and adapted to perform respective processes using input data at the respective inputs and to supply output data at the respective outputs, within a block cycle;

a plurality of unit level routing units, coupled to the plurality of functional units and responsive to respective routing control signals for the plurality of unit level routing units, by which data is steered among the inputs and outputs of the plurality of functional units, unit level routing units in the plurality of unit level routing units being coupled to respective subsets of functional units in the plurality of functional unit, wherein at least one of said respective subsets of functional units is different than another of said respective subsets of functional units; and functional unit level control word distribution circuitry which supplies control words for respective block cycles to the plurality of unit level routing units, said control words including the routing control signals to establish a route in the block cycle for the plurality of unit level routing units, where the route includes applying data output in the block cycle by a first functional unit in the plurality of functional units as input in the block cycle to a second functional unit in the plurality of functional units, and applying data output by the second functional unit in the block cycle as input in the block cycle to a third functional unit in the block cycle.

13. The data processing system of claim 12, wherein said plurality of unit level routing units includes at least one multiplexer having a plurality of inputs and coupled to respective functional units in the plurality of functional units and at least one output coupled to a functional unit in the plurality of functional units, and the routing control signal for the multiplexer specifies one of a plurality of inputs to indicate a source functional unit, and one of the at least one outputs to indicate a destination functional unit.

14. The data processing system of claim 12, wherein said plurality of block level routing units includes at least one crossbar switch.

15. The data processing system of claim 12, wherein said plurality of functional units includes at least one storage element.

16. The data processing system of claim 12, wherein said plurality of functional units includes at least one logic block which performs a plurality of available functions, and includes logic to select an output from one of the plurality of available functions in response to a routing control signal in the control word.

17. The data processing system of claim 12, wherein said plurality of functional units includes a memory responsive to addresses, write control signals, and read control signals, and the function unit level control word distribution circuitry supplies includes at least one of the write control signals and read control signals.

18. The data processing system of claim 17, wherein said function unit level control word distribution circuitry supplies includes an address for said memory.

19. The data processing system of claim 17, wherein an address for said memory is supplied by one of the plurality of functional units.

20. The data processing system of claim 12, wherein functional units in the plurality of functional units comprise logic dedicated to specific processing tasks.

21. The data processing system of claim 12, wherein functional units in the plurality of functional units comprise hardwired logic dedicated to specific processing tasks.

22. The data processing system of claim 12, wherein at least one of said block level control word distribution circuitry and functional level control word distribution circuitry supplies said control words synchronously.

23. A method of processing data, in a data processing engine that includes a plurality of functional units, comprising:

providing a set of software routing control signals in parallel to a set of routing units in the data processing engine to specify a route for a cycle among the plurality of functional units; and routing data among the plurality of functional units according to the set of software routing control signals and performing tasks in the plurality of functional units using the route to produce a result, wherein routing units in the set of routing units are coupled to respective subsets of functional units in the plurality of functional units, wherein at least one of said respective subsets of functional units is different than another of said respective subsets of functional units, where the route includes applying data output in the cycle by a first functional unit in the plurality of functional units as input in the cycle to a second functional unit in the plurality of functional units, and applying data output by the second functional unit in the cycle as input in the cycle to a third functional unit in the cycle.

24. The method of claim 23, including:

compiling a high level programming language specifying the result to produce the set of software routing control signals.

25. The method of claim 23, wherein functional units in the plurality of functional units comprise logic dedicated to specific processing tasks.

26. The method of claim 23, wherein functional units in the plurality of functional units comprise hardwired logic dedicated to specific processing tasks.

27. The method of claim 23, wherein the routing units in the data processing engine comprise a plurality of switches interconnecting the plurality of functional units, and said set of routing control signals specify data paths through the plurality of switches.

28. The method of claim 23, including synchronously routing said data among the plurality of functional units.

29. A method of processing data in a data processing engine that includes a plurality of functional units, comprising:

providing a first set of software routing control signals in parallel to a set of routing units in the data processing engine to specify a first data path according to a first configuration of the plurality of functional units for a first cycle, wherein routing units in the set of routing units are coupled to respective subsets of functional units in the plurality of functional units, wherein at least one of said respective subsets of functional units is different than another of said respective subsets of functional units, where the first data path includes applying data output in the first cycle by a first functional unit in the plurality of functional units as input in the first cycle to a second functional unit in the plurality of functional units, and applying data output by the second functional unit in the first cycle as input in the first cycle to a third functional unit in the first cycle;

performing tasks in said plurality of functional units using the first data path in the first cycle;

providing a second set of software routing control signals in parallel to said set of routing units to specify a second data path according to a second configuration of the plurality of functional units for a second cycle, whereby the plurality of functional units is reconfigured to perform a different function; and performing tasks in said plurality of functional units using the second data path to accomplish said different function in the second cycle.

30. The method of claim 29, wherein functional units in the plurality of functional units comprise logic dedicated to specific processing tasks.

31. The method of claim 29, wherein functional units in the plurality of functional units comprise hardwired logic dedicated to specific processing tasks.

32. The method of claim 29, wherein the routing units in the data processing engine comprises a plurality of switches interconnecting the plurality of functional units, and said first and second sets of routing control signals specify data paths through the plurality of switches.

33. The method of claim 29, including:

compiling a high level programming language specifying the result to produce the first and second sets of software routing control signals.

* * * * *